United States Patent
Thangavelu et al.

(10) Patent No.: US 8,373,351 B2
(45) Date of Patent: Feb. 12, 2013

(54) TRANSITION MODE COMMUTATION FOR INVERTER

(75) Inventors: Sivakumar Thangavelu, Billerica, MA (US); Afroz M. Imam, Danvers, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 306 days.

(21) Appl. No.: 12/962,960

(22) Filed: Dec. 8, 2010

(65) Prior Publication Data

US 2011/0133664 A1 Jun. 9, 2011

Related U.S. Application Data

(60) Provisional application No. 61/267,638, filed on Dec. 8, 2009.

(51) Int. Cl.
*H05B 37/02* (2006.01)

(52) U.S. Cl. ............ 315/224; 315/246; 315/209 R; 315/219

(58) Field of Classification Search ............. 315/209 R, 315/247, 246, 224, 225, 291, 307, 219
See application file for complete search history.

(56) References Cited

U.S. PATENT DOCUMENTS

| | | | |
|---|---|---|---|
| 5,565,743 A | 10/1996 | Yamashita et al. | |
| 2006/0049777 A1 | 3/2006 | Kumagai et al. | |
| 2007/0222392 A1 | 9/2007 | Leyten et al. | |
| 2008/0018265 A1 | 1/2008 | Lee et al. | |
| 2012/0268023 A1* | 10/2012 | Yan et al. | 315/200 R |

OTHER PUBLICATIONS

Jong Taek Kim, International Search Report and Written Opinion of the International Searching Authority, Jul. 1, 2011, pp. 1-8, Daejeon, Republic of Korea.

* cited by examiner

*Primary Examiner* — Tuyet Thi Vo
(74) *Attorney, Agent, or Firm* — Shaun P. Montana (57) ABSTRACT

A driver circuit includes a plurality of switches, forming two switching legs, each of at least two switches and connected between two DC voltage buses. The switches are matched to form diagonal pairs. The driver circuit also includes a load circuit connecting the legs, with a first inductor connected between one leg's switches, and a second inductor connected between the other leg's switches, and lamp terminals between the inductors and in series with the second inductor. The driver circuit also includes a capacitor in parallel with the series-connected lamp terminals and the second inductor, and a control circuit connected to the plurality of switches. During a commutation period, a diagonal pair operates in a non-conductive state and the other in a conductive state, until a current through the first inductor reaches a predefined value. Then the other operates in a non-conductive state until the current through the first inductor reaches zero.

20 Claims, 10 Drawing Sheets

TRANSITION MODE COMMUTATION FOR INVERTER

CROSS-REFERENCE TO RELATED APPLICATION

The present application claims priority of U.S. Provisional Application Ser. No. 61/267,638, filed Dec. 8, 2009, the entire contents of which are hereby incorporated by reference.

TECHNICAL FIELD

The present invention relates to electronics, and more specifically, to electronic ballasts for light sources.

BACKGROUND

Typically, a ballast provides power to a lamp and regulates the current and/or power provided to the lamp. Lamps, such as high intensity discharge (HID) lamps and fluorescent lamps, use a ballast to provide the proper starting voltage for the lamp and to limit the operating current once the lamp is ignited. A ballast generally includes power factor control (PFC) circuitry for sinusoidal input current control and generation of a regulated direct current (DC) bus voltage. A lamp driver, which comprises an inverter, converts the high DC voltage into a suitable AC voltage for energizing the lamp. A commutation period occurs each time the inverter changes the polarity of the voltage provided to the lamp. In conventional ballasts, the commutation period has a duration of around 100 microseconds.

SUMMARY

The duration of the commutation periods in conventional ballasts can lead to problems related to lamp operation. Such problems include, but are not limited to, high Spectral Power Ratio (SPR), re-ignition spikes, poor lumen-maintenance, and audible humming noise originating from the lamp. Embodiments of the present invention provide a lamp driver circuit that limits the commutation period to a duration of less than 100 microseconds, and in so doing, removes and/or limits many of these problems.

In an embodiment, there is provided a driver circuit. The driver circuit includes a plurality of switching components, wherein the plurality of switching components includes a first switching leg and a second switching leg, each connected between a first direct current voltage bus and a second direct current voltage bus, wherein the first switching leg and the second switching leg each include at least a first switching component and a second switching component, and wherein the first switching component of the first switching leg is connected to the second switching component of the second switching leg to form a first diagonal pair and the second switching component of the first switching leg is connected to the first switching component of the second switching leg to form a second diagonal pair. The driver circuit also includes a load circuit connecting the first switching leg and the second switching leg. The load circuit includes a first inductor connected to a terminal between the first switching component and the second switching component of the first switching leg; a second inductor connected to a terminal between the first switching component and the second switching component of the second switching leg; and lamp terminals connected between the first inductor and the second inductor and connected in series with the second inductor. The driver circuit also includes a capacitor connected in parallel with the series connected lamp terminals and the second inductor, and a control circuit connected to the plurality of switching components. During a commutation period, the control circuit is configured to operate the first diagonal pair in a non-conductive state and to operate the second diagonal pair in a conductive state, until a current through the first inductor reaches a predefined value, and then to operate the second diagonal pair in a non-conductive state until the current through the first inductor reaches zero.

In a related embodiment, the first switching leg may include: a first switching component connected to the first direct current voltage bus; a first diode connected across the first switching component; a second switching component connected between the first switching component and the second direct current voltage bus; and a second diode connected across the second switching component; and the second switching leg may include: a third switching component connected to the first direct current voltage bus; a third diode connected across the third switching component; a fourth switching component connected between the third switching component and the second direct current voltage bus; and a fourth diode connected across the fourth switching component; such that the first switching component and the fourth switching component may form the first diagonal pair and the second switching component and the third switching component may form the second diagonal pair.

In another related embodiment, the control circuit may be further configured to operate the plurality of switching components in a first operation mode for a first time period during which the current through the first inductor has a first polarity, and the control circuit may be configured to operate the switching components in a second operation mode for a second time period during which a current through the second inductor has a second polarity, and the commutation period may occur between the first and second time periods.

In yet another related embodiment, the control circuit may be configured to operate the plurality of switching components so that the commutation period has a duration of less than 50 microseconds. In still another related embodiment, the driver circuit may further include a ballast and a high intensity discharge lamp connected across the lamp terminals. The ballast may include: an electromagnetic interference filter configured to receive alternating current voltage from a power source; a rectifier connected to the electromagnetic interference filter to convert the alternating current voltage to direct current voltage; and a power factor control circuit connected to the rectifier, the power factor control circuit having a first output connected to the first direct current voltage bus and a second output connected to the second direct current voltage bus, wherein the power factor control circuit may be configured to produce a high direct current voltage output across the first and second outputs.

In another embodiment, there is provided a driver circuit. The driver circuit includes: a plurality of switching components, wherein the plurality of switching components includes a first switching leg and a second switching leg, each connected between a first direct current voltage bus and a second direct current voltage bus, wherein the first switching leg and the second switching leg each include at least a first switching component and a second switching component, and wherein the first switching component of the first switching leg is connected to the second switching component of the second switching leg to form a diagonal pair and the second switching component of the first switching leg is connected to the first switching component of the second switching leg to form a diagonal pair. The driver circuit also includes a load circuit connecting the first switching leg and the second switching leg, wherein the load circuit includes: a first inductor connected to a terminal between the first switching component and the second switching component of the first switching leg; a second inductor connected to a terminal between the first switching component and the second switching component of the second switching leg; and lamp terminals connected between the first inductor and the second inductor and connected in series with the second inductor. The driver circuit also includes a capacitor connected in parallel with the series connected lamp terminals and the second inductor; and a control circuit having a plurality of control outputs, wherein each control output in the plurality of control outputs is connected to a corresponding switching component in the plurality of switching components. The control circuit is configured to operate the plurality of switching components: (i) in a first operation mode for a first time period, during which a current through the first inductor has a first polarity; (ii) in a second operation mode for a second time period, during which the current through the first inductor has a second polarity that is opposite of the first polarity; and (iii) in a third operating mode during a commutation period, during which a polarity of a current through the capacitor is being reversed; wherein during the commutation period, the control circuit is configured to operate a first diagonal pair in a non-conductive state and to operate a second diagonal pair in a conductive state, until the current through the first inductor reaches a predefined value, and then to operate the second diagonal pair in a non-conductive state until the current through the first inductor reaches zero.

In a related embodiment, the first switching leg may include: a first switching component connected to the first direct current voltage bus; a first diode connected across the first switching component; a second switching component connected between the first switching component and the second direct current voltage bus; and a second diode connected across the second switching component; and the second switching leg may include: a third switching component connected to the first direct current voltage bus; a third diode connected across the third switching component; a fourth switching component connected between the third switching component and the second direct current voltage bus; and a fourth diode connected across the fourth switching component; such that the first switching component and the fourth switching component may form a diagonal pair and the second switching component and the third switching component may form a diagonal pair.

In another related embodiment, the first operation mode may be a positive cycle operation mode during which the current through the first inductor has a positive polarity, and the second operation mode may be a negative cycle operation mode during which the current through the first inductor has a negative polarity, and wherein the control circuit may be configured to operate in the third operating mode during transitions from the positive cycle operation mode to the negative cycle operation mode and from the negative cycle operation mode to the positive cycle operation mode.

In yet another related embodiment, the third operation mode may be a positive-to-negative transition mode during a commutation period in which the polarity of the current through the capacitor is being changed from positive to negative, and during the positive-to-negative transition mode the first diagonal pair may be the diagonal pair of switching components comprising the first switching component of the first switching leg and the second switching component of the second switching leg, and the second diagonal pair of switching components may be the diagonal pair of switching components comprising the second switching component of the first switching leg and the first switching component of the second switching leg.

In still another related embodiment, the third operation mode may be a negative-to-positive transition mode during a commutation period in which the polarity of the current through the capacitor is being changed from negative to positive, and during the negative-to-positive transition mode the first diagonal pair of switching components may be the diagonal pair of switching components comprising the second switching component of the first switching leg and the first switching component of the second switching leg and the second diagonal pair of switching components may be the diagonal pair of switching components comprising the first switching component of the first switching leg and the second switching component of the second switching leg.

In yet still another related embodiment, the control circuit may be configured to operate the plurality of switching components so that the commutation period has a duration of less than 50 microseconds.

In still yet another related embodiment, the driver circuit may further include a ballast and a high intensity discharge lamp connected across the lamp terminals, wherein the ballast may include: an electromagnetic interference filter configured to receive alternating current voltage from a power source; a rectifier connected to the electromagnetic interference filter to convert the alternating current voltage to direct current voltage; and a power factor control circuit connected to the rectifier, the power factor control circuit having a first output connected to the first direct current voltage bus and a second output connected to the second direct current voltage bus, wherein the power factor control circuit may be configured to produce a high direct current voltage output across the first and second outputs.

In another embodiment, there is provided a ballast. The ballast includes: an electromagnetic interference filter configured to receive alternating current voltage from a power source; a rectifier connected to the electromagnetic interference filter to convert the alternating current voltage to direct current voltage; a power factor control circuit connected to the rectifier, the power factor control circuit having a first output and a second output, wherein the power factor control circuit is configured to produce a high direct current voltage output across the first and second outputs; a first direct current voltage bus connected to the first output of the power factor control circuit; a second direct current voltage bus connected to the second output of the power factor control circuit; a plurality of switching components, wherein the plurality of switching components includes a first switching leg and a second switching leg, each connected between a first direct current voltage bus and a second direct current voltage bus, wherein the first switching leg and the second switching leg each include at least a first switching component and a second switching component, and wherein the first switching component of the first switching leg is connected to the second switching component of the second switching leg to form a diagonal pair and the second switching component of the first switching leg is connected to the first switching component of the second switching leg to form a diagonal pair; a load circuit connecting the first switching leg and the second switching leg, wherein the load circuit includes: a first inductor connected to a terminal between the first switching component and the second switching component of the first switching leg; a second inductor connected to a terminal between the first switching component and the second switching component of the second switching leg; and lamp terminals connected between the first inductor and the second inductor and connected in series with the second inductor; a capacitor connected in parallel with the series connected lamp terminals and the second inductor; and a control circuit connected to the plurality of switching components, wherein during a commutation period the control circuit is configured to operate a first diagonal pair in a non-conductive state and to operate a second diagonal pair in a conductive state, until a current through the first inductor reaches a predefined value, and then to operate the second diagonal pair in a non-conductive state until the current through the first inductor reaches zero.

In a related embodiment, the first switching leg may include: a first switching component connected to the first direct current voltage bus; a first diode connected across the first switching component; a second switching component connected between the first switching component and the second direct current voltage bus; and a second diode connected across the second switching component; and the second switching leg may include: a third switching component connected to the first direct current voltage bus; a third diode connected across the third switching component; a fourth switching component connected between the third switching component and the second direct current voltage bus; and a fourth diode connected across the fourth switching component; such that the first switching component and the fourth switching component may form a diagonal pair and the second switching component and the third switching component may form a diagonal pair.

In another related embodiment, the ballast may further include an electrolytic capacitor connected in a shunt configuration across the first and second outputs of the power factor control circuit. In yet another related embodiment, the ballast may further include a high intensity discharge (HID) lamp connected across the lamp terminals.

In still another related embodiment, the control circuit may be further configured to operate the plurality of switching components in a positive operation mode for a first time period during which the current through the first inductor has a positive polarity, and the control circuit may be configured to operate the plurality of switching components in a negative operation mode for a second time period during which a current through the second inductor has a negative polarity, and the commutation period may occur between the first and second time periods.

In yet still another related embodiment, during a commutation period in which the polarity of a current through the capacitor is being changed from positive to negative, the first diagonal pair may be the diagonal pair of switching components comprising the first switching component of the first switching leg and the second switching component of the second switching leg, and the second diagonal pair of switching components may be the diagonal pair of switching components comprising the second switching component of the first switching leg and the first switching component of the second switching leg.

In still yet another related embodiment, during a commutation period in which a polarity of a current through the capacitor is being changed from negative to positive, the first diagonal pair of switching components may be the diagonal pair of switching components comprising the second switching component of the first switching leg and the first switching component of the second switching leg, and the second diagonal pair of switching components may be the diagonal pair of switching components comprising the first switching component of the first switching leg and the second switching component of the second switching leg.

In yet another related embodiment, the control circuit may be configured to operate the plurality of switching components so that the commutation period has a duration of less than 50 microseconds.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 2A-5B each illustrate exemplary current paths through an inverter of the ballast of the lamp system of FIG. 1.

DETAILED DESCRIPTION

Figure 1:
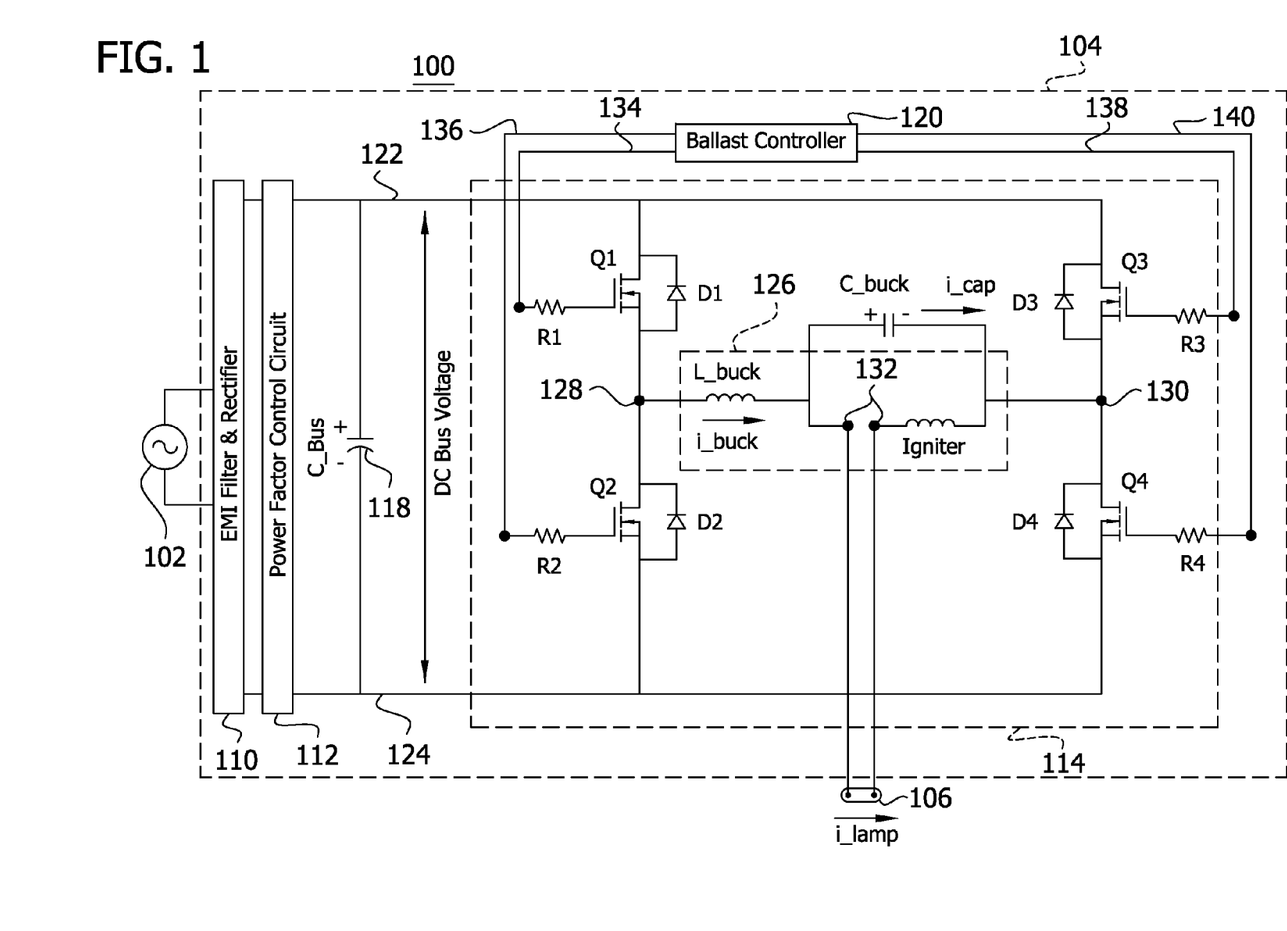
FIG. 1 is a schematic of a lamp system including a ballast with an inverter for use with an input power source to energize a lamp according to embodiments disclosed herein.

FIG. 1 illustrates a lamp system 100 according to embodiments described herein. The lamp system 100 includes an input power source 102, such as an alternating current (AC) power source, an electronic ballast 104, and a lamp 106. The lamp system 100 described herein is used to energize, for example, one or more HID lamps 106. Exemplary HID lamps include, but are not limited to, mercury vapor, metal halide, high-pressure sodium, and low-pressure sodium lamps. The lamp system 100 may be used to energize other types of lamps, such as a fluorescent lamp, without departing from the scope of the invention.

The electronic ballast 104 includes one or more input terminals adapted to connect to the input power source 102 and a ground terminal connectable to ground potential. In some embodiments, the input power source 102 includes a first voltage source and a second voltage source, and the electronic ballast 104 is operatively connected to either the first voltage source or the second voltage source. Thus, the electronic ballast 104 may selectively receive power from either the first voltage source (e.g., 208 volts AC) or the second voltage source (e.g., 347 volts, 480 volts). Other input power sources 102 known in the art may be used without departing from the scope of the present invention.

The electronic ballast 104 receives an input AC power signal from the input power source 102 via the input terminal. In some embodiments, the electronic ballast 104 includes an electromagnetic interference (EMI) filter and a rectifier (e.g., full-wave rectifier), illustrated generally at 110. The EMI filter prevents noise, which may be generated by the electronic ballast 104, from being transmitted back to the input power source 102. The rectifier converts AC voltage of the input power signal to DC (direct current) voltage.

The electronic ballast 104 includes a power stage to convert power supplied by the input power source 102 to drive the lamp 106. In FIG. 1, the electronic ballast 104 includes a first power stage comprising a power factor control circuit 112. The power factor control circuit 112, such as a boost converter, receives the rectified input power signal and produces a high DC voltage (e.g., 460 volts DC). The electronic ballast 104 also includes a second power stage comprising a lamp driver (broadly, lamp driver and ignition circuit) 114. In particular, as described below, the lamp driver 114 includes an inverter circuit that converts the high DC voltage into a suitable AC voltage to energize the lamp 106. A capacitor 118, such as an electrolytic capacitor, is connected in a shunt configuration between the first power stage (e.g., power factor control circuit 112) and the second power stage (e.g., lamp driver 114) to provide a low impedance source of voltage to the inverter. The electronic ballast 104 includes a controller 120 (broadly referred to throughout as a "control circuit") to control the operations of the components of the electronic ballast 104. In some embodiments, the controller 120 has one or more control outputs which electrically connect the controller 120 to the lamp driver 114. For example, the controller 120 may be a microcontroller that may have control outputs that are electrically connected to the lamp driver 114 via driver control circuits.

In FIG. 1, the lamp driver (broadly referred to throughout as a "driver circuit") 114 comprises a first DC voltage bus 122 and a second DC voltage bus 124 (e.g., high DC voltage bus and low DC voltage bus, respectively) connected to the power factor control circuit 112 and the capacitor 118. A first switching leg and a second switching leg are each connected between the first DC voltage bus 122 and the second DC voltage bus 124. The first switching leg includes a first switching component Q1 connected to the first DC voltage bus 122, and a first diode D1 connected (e.g., shunted) across the first switching component Q1. The first switching leg also includes a second switching component Q2 connected between the first switching component Q1 and the second DC voltage bus 124, and a second diode D2 connected (e.g., shunted) across the second switching component Q2. Thus, the first switching component Q1 in combination with the first diode D1 is connected in series with the second switching component Q2 in combination with the second diode D2.

Similarly, the second switching leg includes a third switching component Q3 connected to the first DC voltage bus 122, and a third diode D3 connected (e.g., shunted) across the third switching component Q3. The second switching leg also includes a fourth switching component Q4 connected between the third switching component Q3 and the second voltage bus 124, and a fourth diode connected (e.g., shunted) across the fourth switching component Q4. Thus, the third switching component Q3 in combination with the third diode D3 is connected in series with the fourth switching component Q4 in combination with the fourth diode D4. In some embodiments, each of the switching components Q1, Q2, Q3, and Q4 is a metal-oxide-semiconductor field-effect transistor (MOSFET). However, the scope of the present invention is not limited to a particular type of switch.

A load circuit 126 connects the first switching leg to the second switching leg. In particular, a first inductor $L_{buck}$ is connected to a terminal 128 between the first switching component Q1 and the second switching component Q2. A second inductor (e.g., igniter) is connected to a terminal 130 between the third switching component Q3 and the fourth switching component Q4. Load terminals 132 are connected between the first inductor $L_{buck}$ and the second inductor (e.g., igniter) and are adapted for connecting a load, such as a lamp 106, in series with the first inductor $L_{buck}$ and the second inductor (e.g., igniter). A capacitor $C_{buck}$ is connected in parallel with the series arrangement of the lamp terminals 132 and the second inductor (e.g., igniter).

As shown in FIG. 1, the controller 120 includes a first control output 134 connected to the first switching component Q1, a second control output 136 connected to the second switching component Q2, a third control output 138 connected to the third switching component Q3, and a fourth control output 140 connected to the fourth switching component Q4. In operation, the controller 120 operates the first, second, third, and fourth switching components Q1, Q2, Q3, Q4 via the first, second, third, and fourth control outputs 134, 136, 138, 140, respectively, in diagonal pairs in order to convert the high DC voltage generated by the power factor control circuit 112 to an AC voltage signal suitable to energize the lamp 106. The AC voltage signal is comprised of positive cycles and negative cycles. In particular, the first switching component Q1 and the fourth switching component Q4 form a diagonal pair that is operated to generate the positive cycles of the AC voltage signal. Similarly, the second switching component Q2 and the third switching component Q3 form a diagonal pair that is operated to generate the negative cycles of the AC voltage signal.

Accordingly, the controller 120 is configured to operate the switching components Q1, Q2, Q3, and Q4 according to a plurality of operation modes. More particularly, the controller 120 is configured to operate the switching components Q1, Q2, Q3, and Q4 in a first operation mode for a first time period (e.g., T1) during which the current through or voltage across the first inductor $L_{buck}$ has a first polarity (e.g., positive, negative). The controller 120 is configured to operate the switching components Q1, Q2, Q3, and Q4 in a second operation mode for a second time period (e.g., T2) during which the current through or voltage across the first inductor $L_{buck}$ has a second polarity (e.g., positive, negative) that is opposite of the first polarity. For example, the first and second operation modes may be the positive cycle operation mode and the negative cycle operation mode described below. The controller 120 is configured to operate the switching components Q1, Q2, Q3, and Q4 in a third operation mode for a third time period (e.g., T3). The third time period is a commutation period during which a polarity of the current through or voltage across the capacitor is being reversed. The third time period (e.g., commutation period) represents a transition time needed to switch the polarity of the current through or voltage across the capacitor $C_{buck}$. Thus, there will be a commutation period each time the controller 120 transitions from the first time period T1 to the second time period T2 and from the second time period T2 back to the first time period T1.

More particularly, in some embodiments, the controller 120 is configured to operate the switching components in a positive cycle operation mode, a negative cycle operation mode, a positive-to-negative transition mode operation, and a negative-to-positive transition mode operation. During the positive cycle operation mode, the controller 120 operates the inverter (i.e., switching components Q1, Q2, Q3, Q4) so that a positive portion of an AC voltage signal is provided to the lamp 106. During the negative cycle operation mode, the controller 120 operates the inverter (i.e., switching components Q1, Q2, Q3, Q4) so that a negative portion of an AC voltage signal is provided to the lamp 106. During the positive-to-negative transition operation mode, the controller 120 operates the inverter (i.e., switching components Q1, Q2, Q3, Q4) to transition the polarity of the AC voltage signal provided to the lamp 106 from positive to negative. Similarly, during the negative-to-positive transition operation mode, the controller 120 operates the inverter (i.e., switching components Q1, Q2, Q3, Q4) to transition the polarity of the AC voltage signal provided to the lamp 106 from negative to positive. The switching sequence described below employed by the controller 120 during the positive-to-negative transition operation mode and during the negative-to-positive transition mode minimizes commutation time. As such, embodiments of the present invention reduce Spectral Power Ratio (SPR), re-ignition spikes, poor lumen-maintenance, and audible humming noise produced by the lamp 106.

Figure 2A:
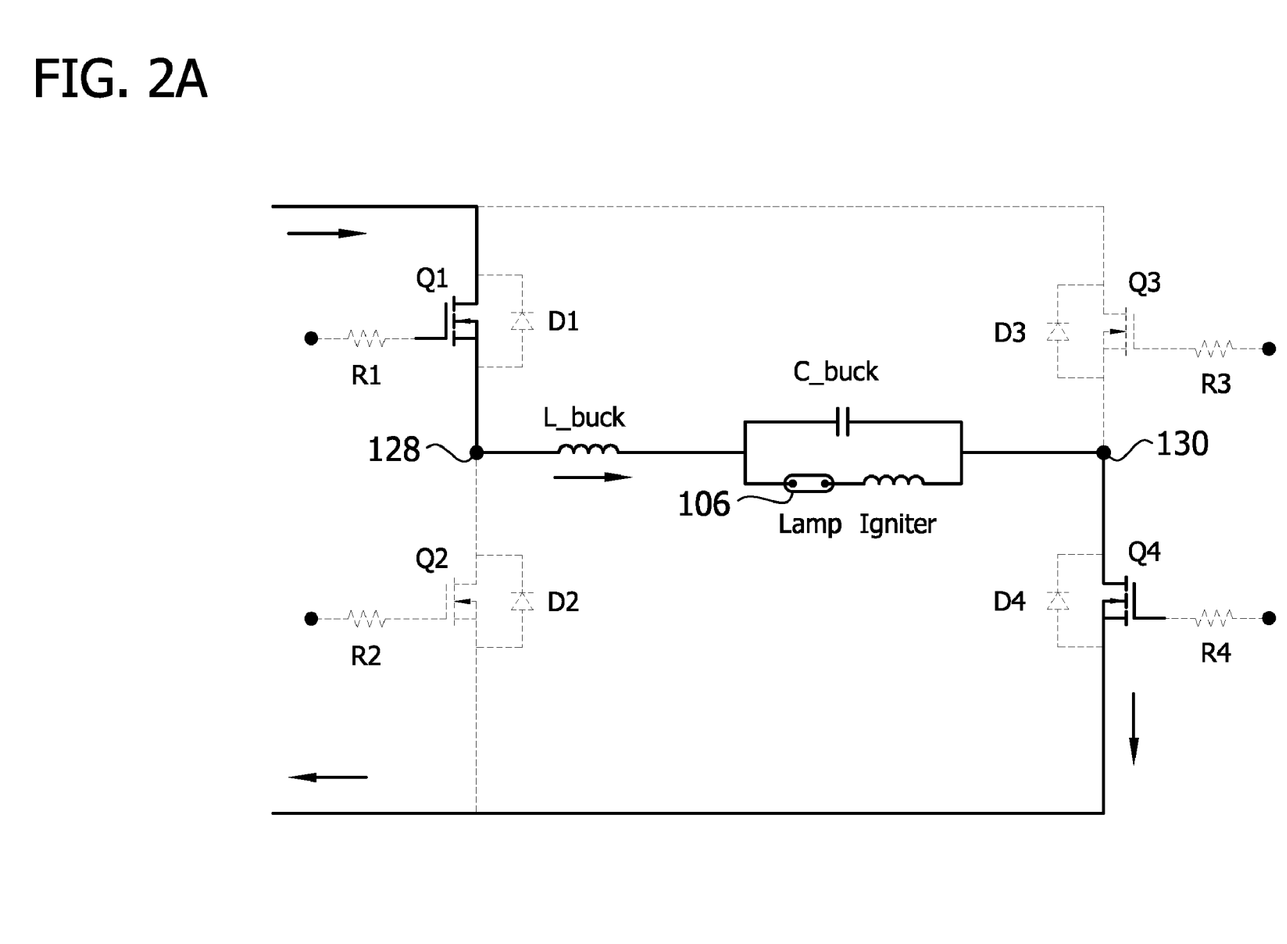
Figure 2B:
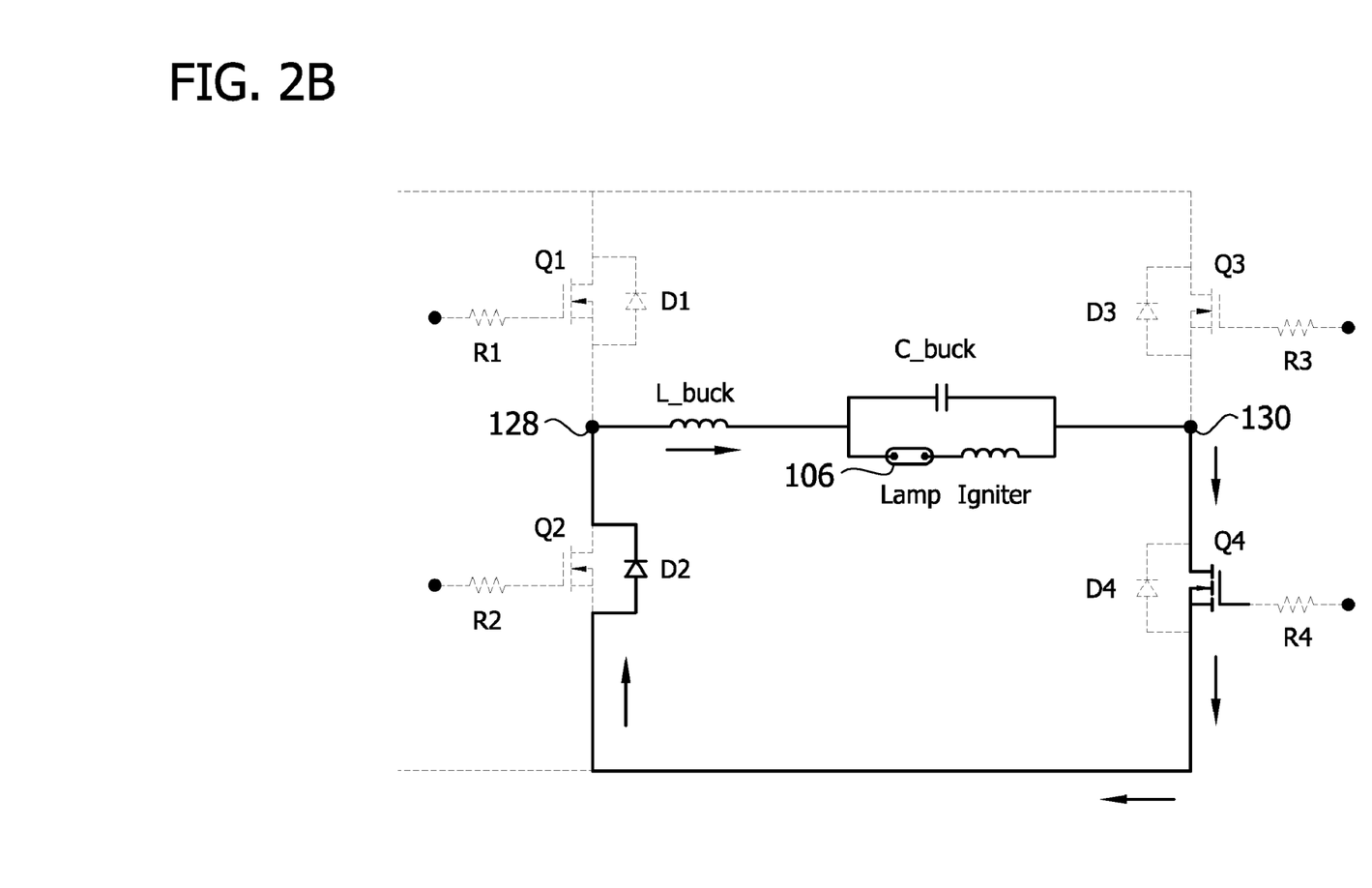

Referring to FIGS. 2A and 2B, during the positive cycle operation mode, the controller 120 operates the inverter (i.e., switching components Q1, Q2, Q3, Q4) between two different states. In the first state (i.e., positive cycle state 1), illustrated in FIG. 2A, the diagonal pair of switching components comprising the second switching component Q2 and the third switching component Q3, is non-conductive. The diagonal pair of switching components comprising the first switching component Q1 and the fourth switching component Q4, is conductive. As such, current flows in a path from the first DC voltage bus and through the first switching component Q1 and the first inductor $L_{buck}$. The current path then divides so that current flows through the capacitor $C_{buck}$ and the lamp 106 and second inductor (i.e., igniter). The current path continues through the fourth switching component Q4 to the second DC voltage bus. Accordingly, the current through the first inductor $L_{buck}$ rises and a positive voltage is generated across the lamp 106.

In the second state during the positive cycle operation mode (i.e., positive cycle state 2), illustrated in FIG. 2B, the second switching component Q2 and the third switching component Q3 remain non-conductive. The first switching component Q1 is turned OFF so that it is non-conductive. Energy stored by the first inductor $L_{buck}$ dissipates to generate a decreasing current that flows in a closed loop through the capacitor $C_{buck}$, the lamp 106, and the second inductor (i.e., igniter) to the fourth switching component Q4, and then from the anode to the cathode of the second diode D2. As such, a positive voltage is maintained across the lamp 106. When the current through the first inductor $L_{buck}$ reaches zero, the controller 120 returns the inverter to the positive cycle state 1. As such, the first switching component Q1 is turned ON so that it is conductive.

Figure 3A:
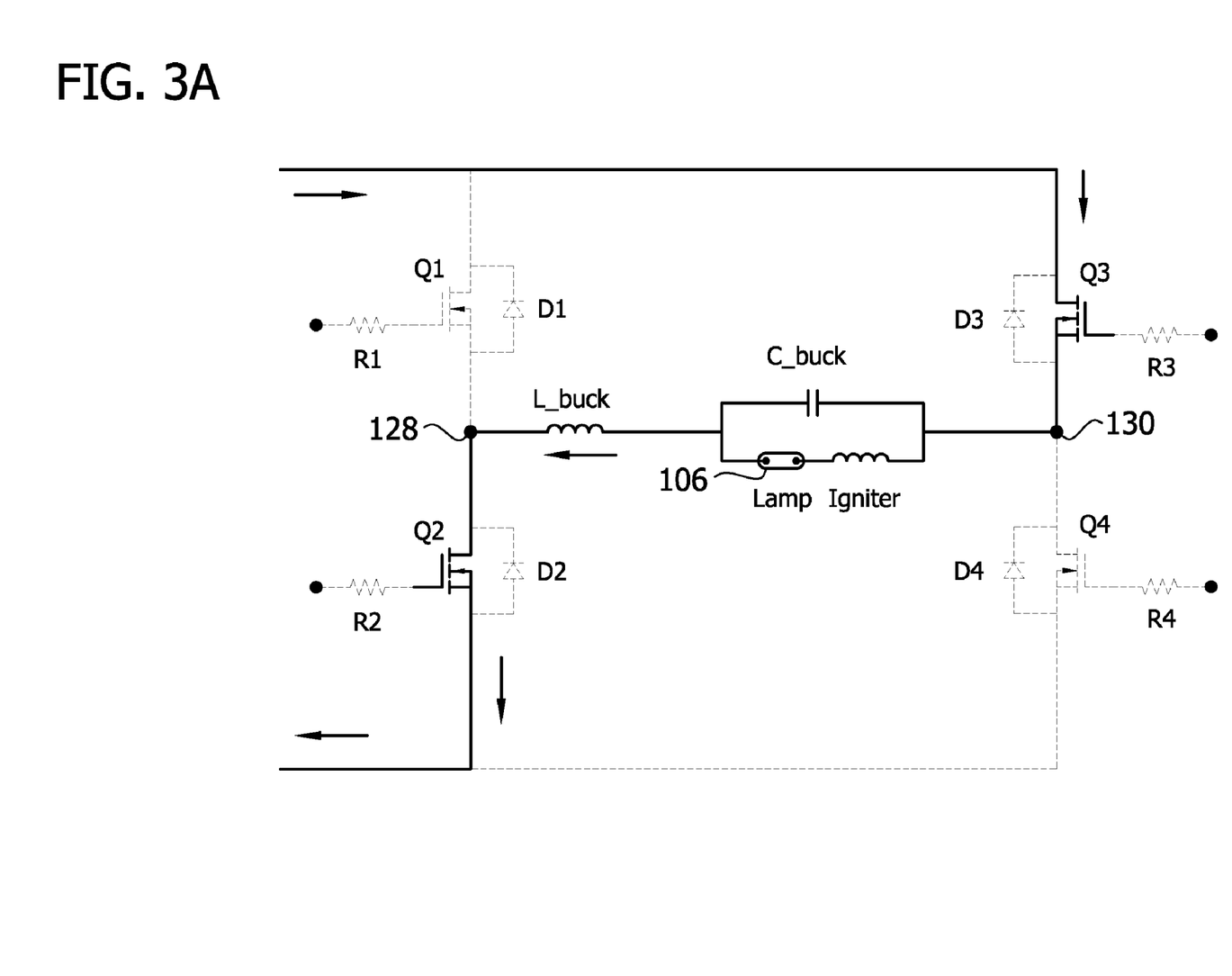
Figure 3B:
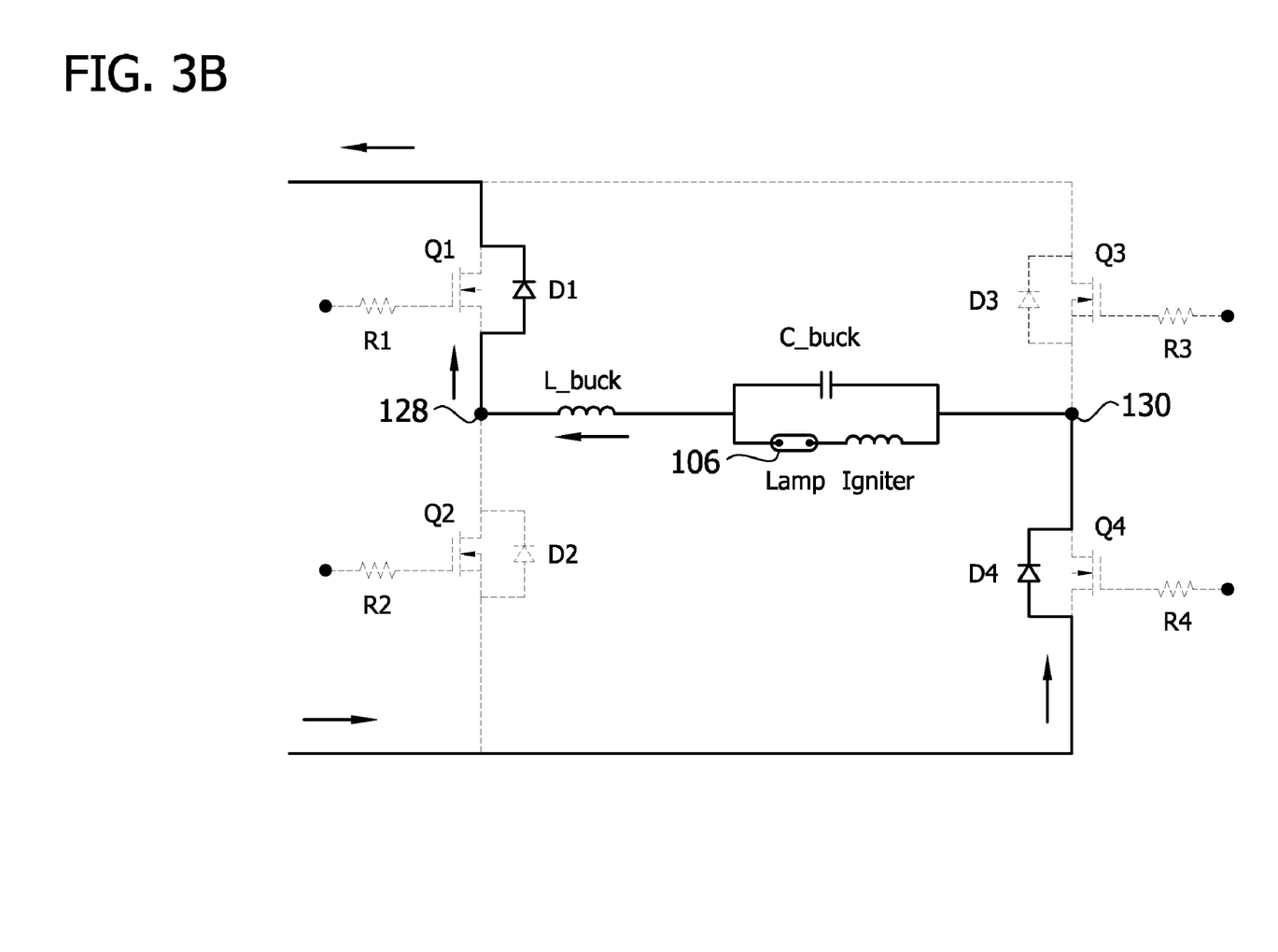

Subsequent to the positive cycle operation mode, which, in some embodiments, includes either positive cycle state 1 or positive cycle state 2, and in other embodiments, includes both positive cycle state 1 and positive cycle state 2, the positive-to-negative transition mode is initiated. Referring to FIGS. 3A and 3B, during the positive-to-negative transition mode, the controller 120 operates the inverter (i.e., switching components Q1, Q2, Q3, Q4) between two different states. In the first state (i.e., positive-to-negative state 1) illustrated in FIG. 3A, the diagonal pair of switching components comprising the first switching component Q1 and the fourth switching component Q4, is non-conductive. The diagonal pair of switching components comprising the second switching component Q2 and the third switching component Q3, is conductive. As such, current flows in path from the first DC voltage bus and through the third switching component Q3. The current path then divides so that current flows through capacitor $C_{buck}$, the lamp 106, and the second inductor (i.e., igniter). The current path continues through the first inductor $L_{buck}$, through the second switching component Q2 to the second DC voltage bus. Accordingly, the current through the first inductor $L_{buck}$ rises.

When the current through the first inductor $L_{buck}$ reaches a predefined value (e.g., peak value), the second state (i.e., positive-to-negative state 2) of the positive-to-negative transition mode is initiated. In the positive-to-negative state 2, illustrated in FIG. 3B, each of the switching components Q1, Q2, Q3, and Q4 are non-conductive. As such, energy stored by the first inductor $L_{buck}$ dissipates to generate a decreasing current that flows in a path from the second DC voltage bus and through the fourth diode D4. The current path divides so that current flows through the capacitor $C_{buck}$, the lamp 106, and the second inductor (i.e., igniter). The current path then continues through the first inductor $L_{buck}$, through the first diode D1, to the first DC voltage bus. When the current through the first inductor $L_{buck}$ reaches zero, the controller 120 returns the inverter to the positive-to-negative state 1.

Figure 4A:
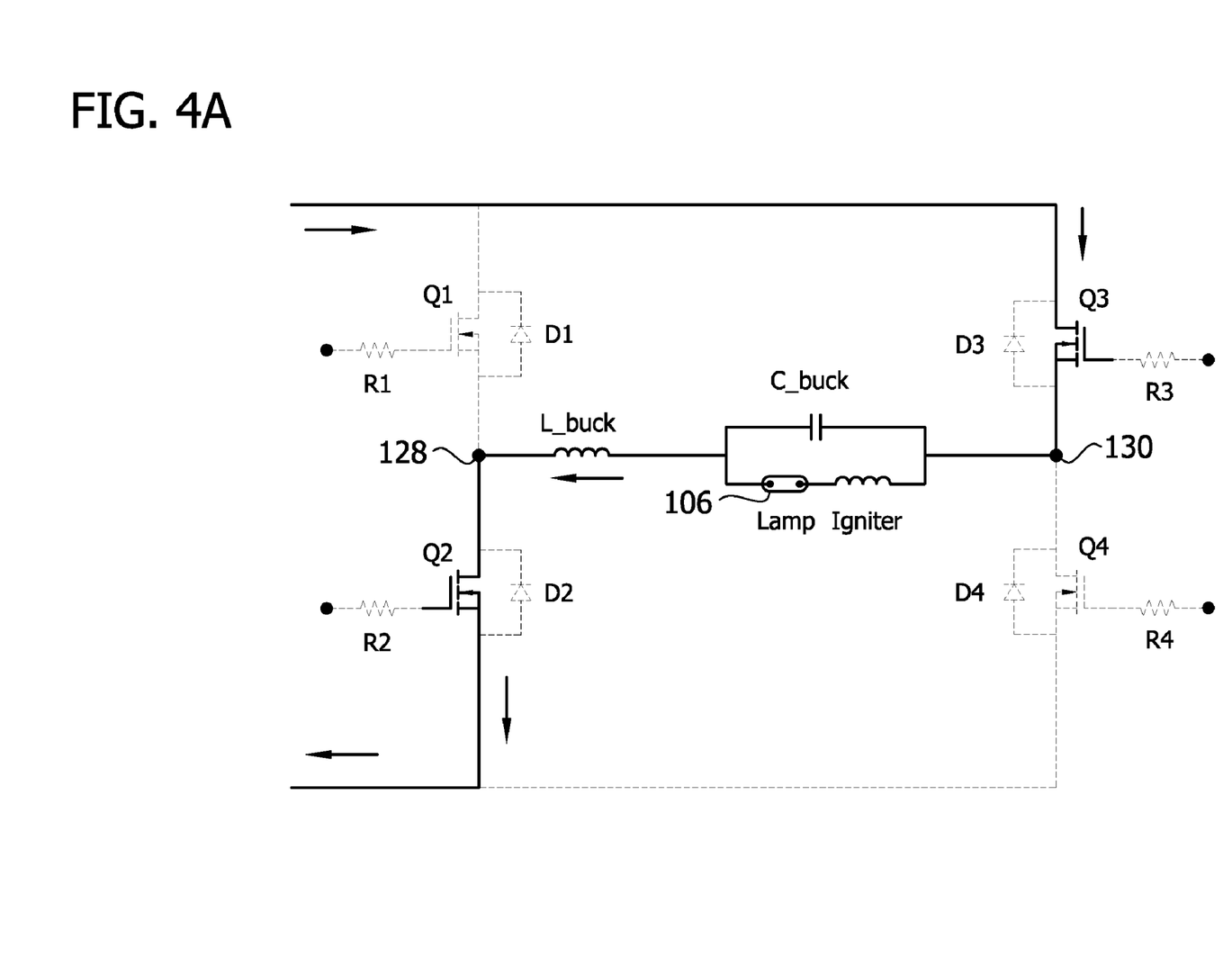
Figure 4B:
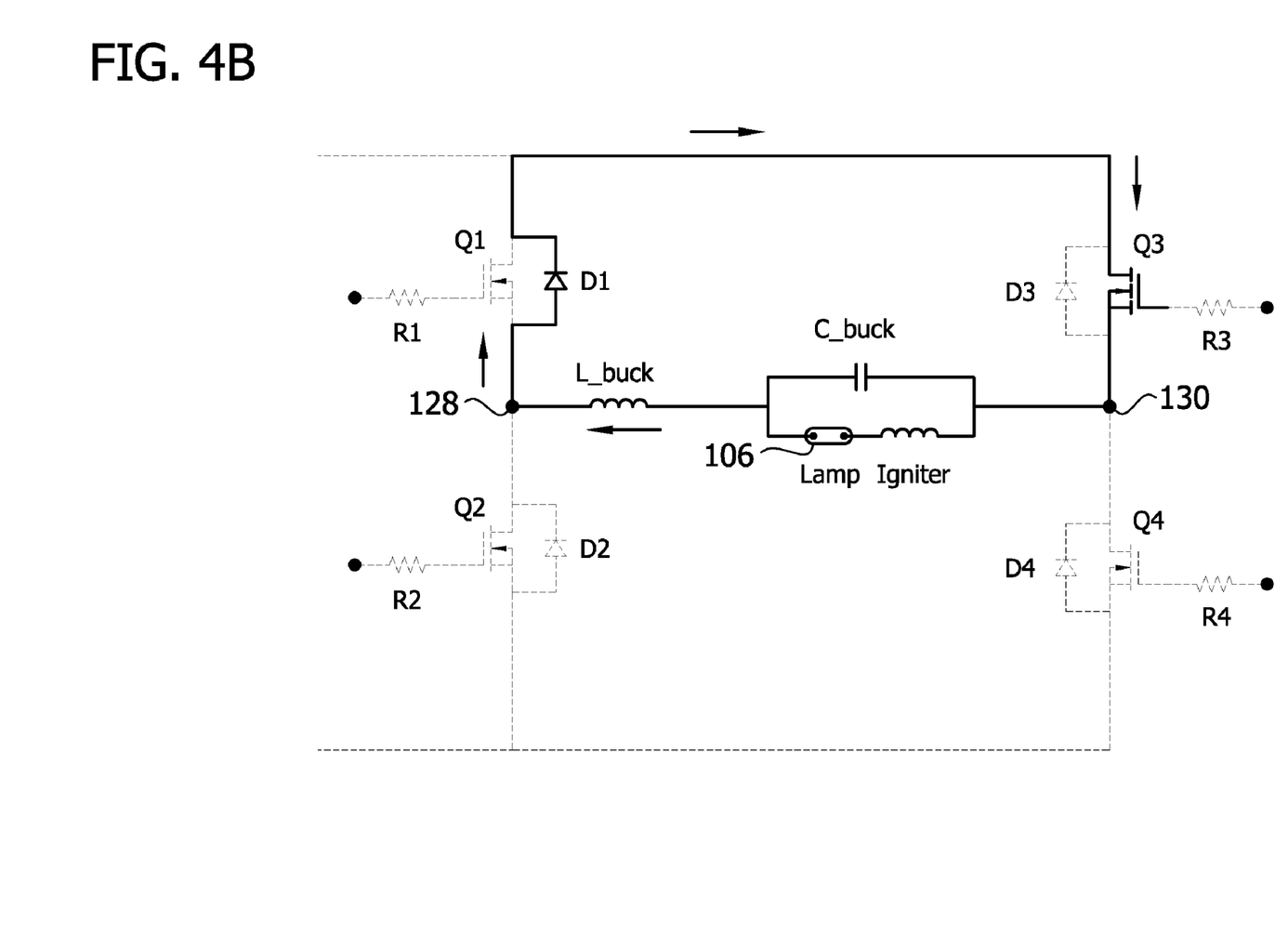

Referring to FIGS. 4A and 4B, during the negative cycle operation mode, the controller 120 operates the inverter (i.e., switching components Q1, Q2, Q3, Q4) between two different states. In the first state (i.e., negative cycle state 1), illustrated in FIG. 4A, the diagonal pair of switching components comprising the first switching component Q1 and the fourth switching component Q4, is non-conductive. The diagonal pair of switching components comprising the second switching component Q2 and the third switching component Q3, is conductive. As such, current flows from the first DC voltage bus and through the third switching component Q3. The current path then divides so that current flows through the capacitor $C_{buck}$, the lamp 106, and the second inductor (i.e., igniter). The current path continues through the first inductor $L_{buck}$, and the second switching component Q2 to the second DC voltage bus. Accordingly, the current through the first inductor $L_{buck}$ rises and a negative voltage is generated across the lamp 106.

In the second state during the negative cycle operation mode (negative cycle state 2), illustrated in FIG. 4B, the first switching component Q1 and the fourth switching component Q4 remain non-conductive. The second switching component Q2 is turned OFF so that it is non-conductive. Energy stored by the first inductor $L_{buck}$ dissipates to generate a decreasing current that flows in a closed loop from the anode to the cathode of the first diode D1, through the third switching component Q3, and then through the capacitor $C_{buck}$, the lamp 106, and the second inductor (i.e., igniter). As such, a negative voltage is maintained across the lamp 106. When the current through the first inductor $L_{buck}$ reaches zero, the controller 120 returns the inverter to the negative cycle state 1. As such, the second switching component Q2 is turned ON so that it is conductive.

Figure 5A:
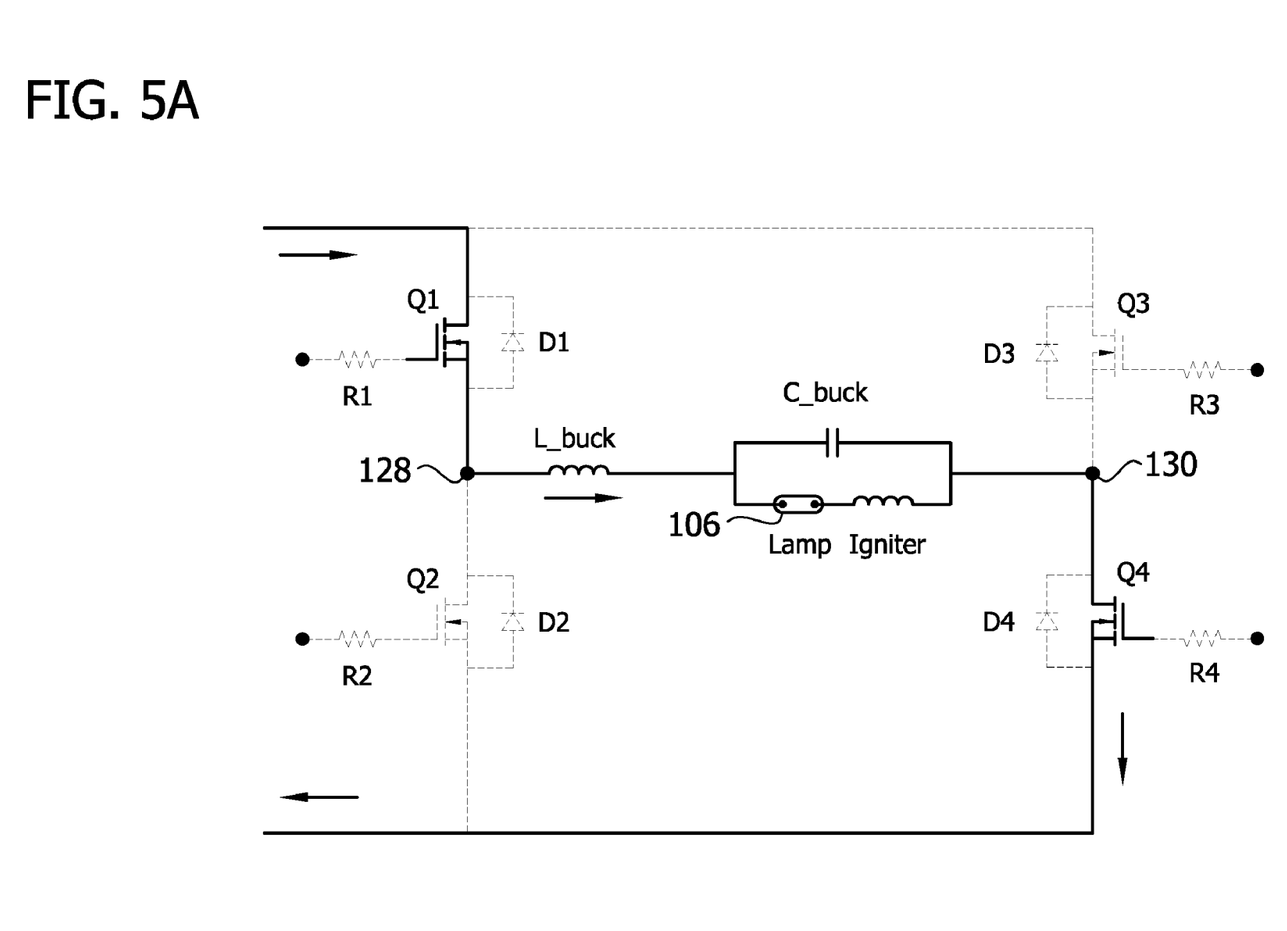
Figure 5B:
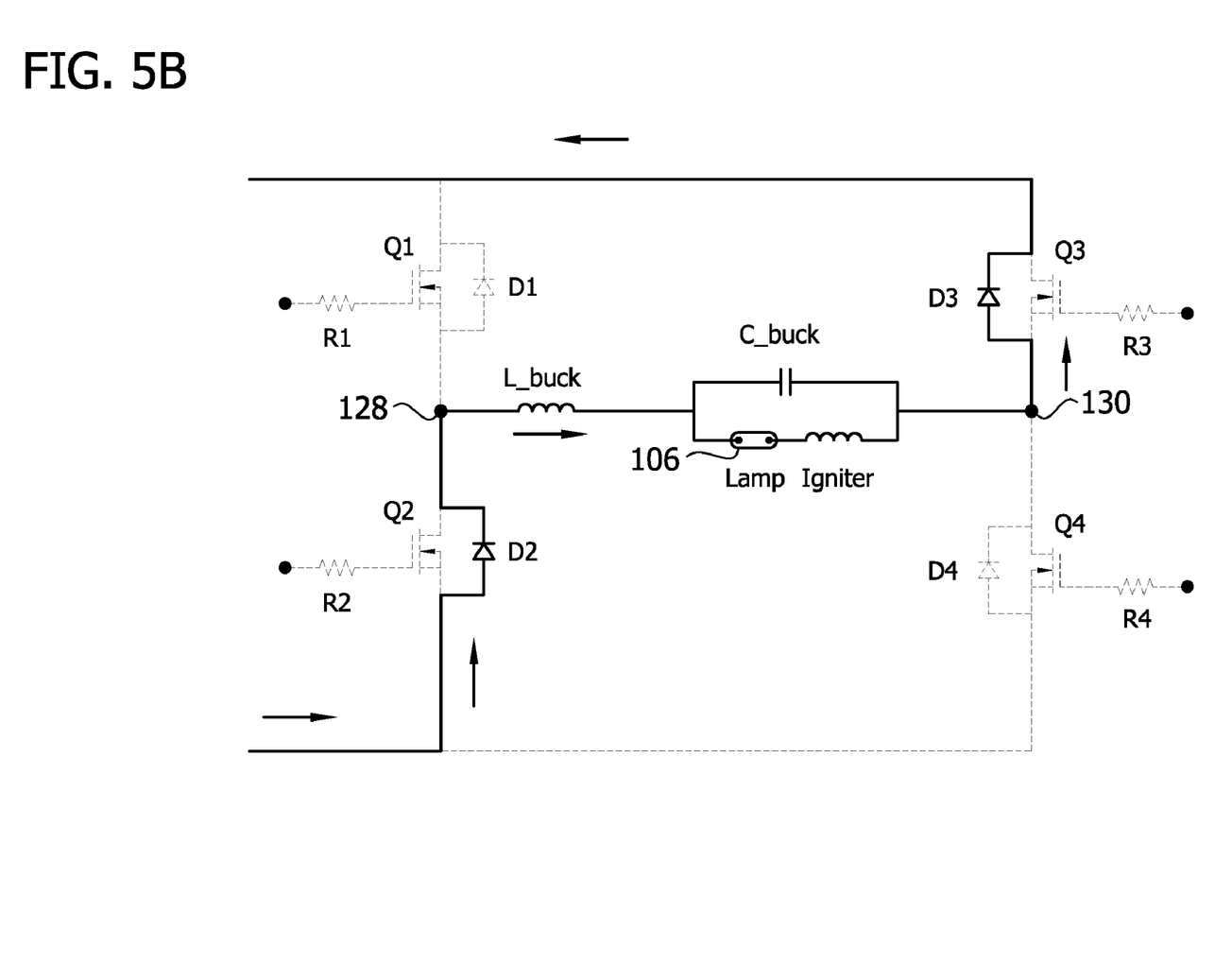

Subsequent to the negative cycle operation mode, which, in some embodiments, includes either negative cycle state 1 or negative cycle state 2, and in other embodiments, includes both negative cycle state 1 and negative cycle state 2, the negative-to-positive transition mode is initiated. Referring to FIGS. 5A and 5B, during the negative-to-positive transition mode, the controller 120 operates the inverter (i.e., switching components Q1, Q2, Q3, Q4) between two different states. In the first state (i.e., negative-to-positive state 1), illustrated in FIG. 5A the diagonal pair of switching components comprising the second switching component Q2 and the third switching component Q3, is non-conductive. The diagonal pair of switching components comprising the first switching component Q1 and the fourth switching component Q4, is conductive. As such, current flows in path from the first DC voltage bus through the first switching component Q1, and through the first inductor $L_{buck}$. The current path then divides so that current flows through capacitor $C_{buck}$, the lamp 106 and the second inductor (i.e., igniter). The current path continues through the fourth switching component Q4 to the second DC voltage bus. Accordingly, the current through the first inductor $L_{buck}$ rises.

When the current through the first inductor $L_{buck}$ reaches a predefined value (e.g., peak value), the second state (i.e., negative-to-positive state 2) of the negative-to-positive transition mode is initiated. In the negative-to-positive state 2, illustrated in FIG. 5B, each of the switching components Q1, Q2, Q3, and Q4 is non-conductive. As such, energy stored by the first inductor $L_{buck}$ dissipates to generate a decreasing current that flows in a path from the second DC voltage bus, through the second diode D2, and through the first inductor $L_{buck}$. The current path is then divided so that current flows through the capacitor $C_{buck}$, the lamp 106 and the second inductor (i.e., igniter). The current path continues through the third diode D3 to the first DC voltage bus. When the current through the first inductor $L_{buck}$ reaches zero, the controller 120 returns the inverter to the negative-to-positive state 1.

Figure 6:
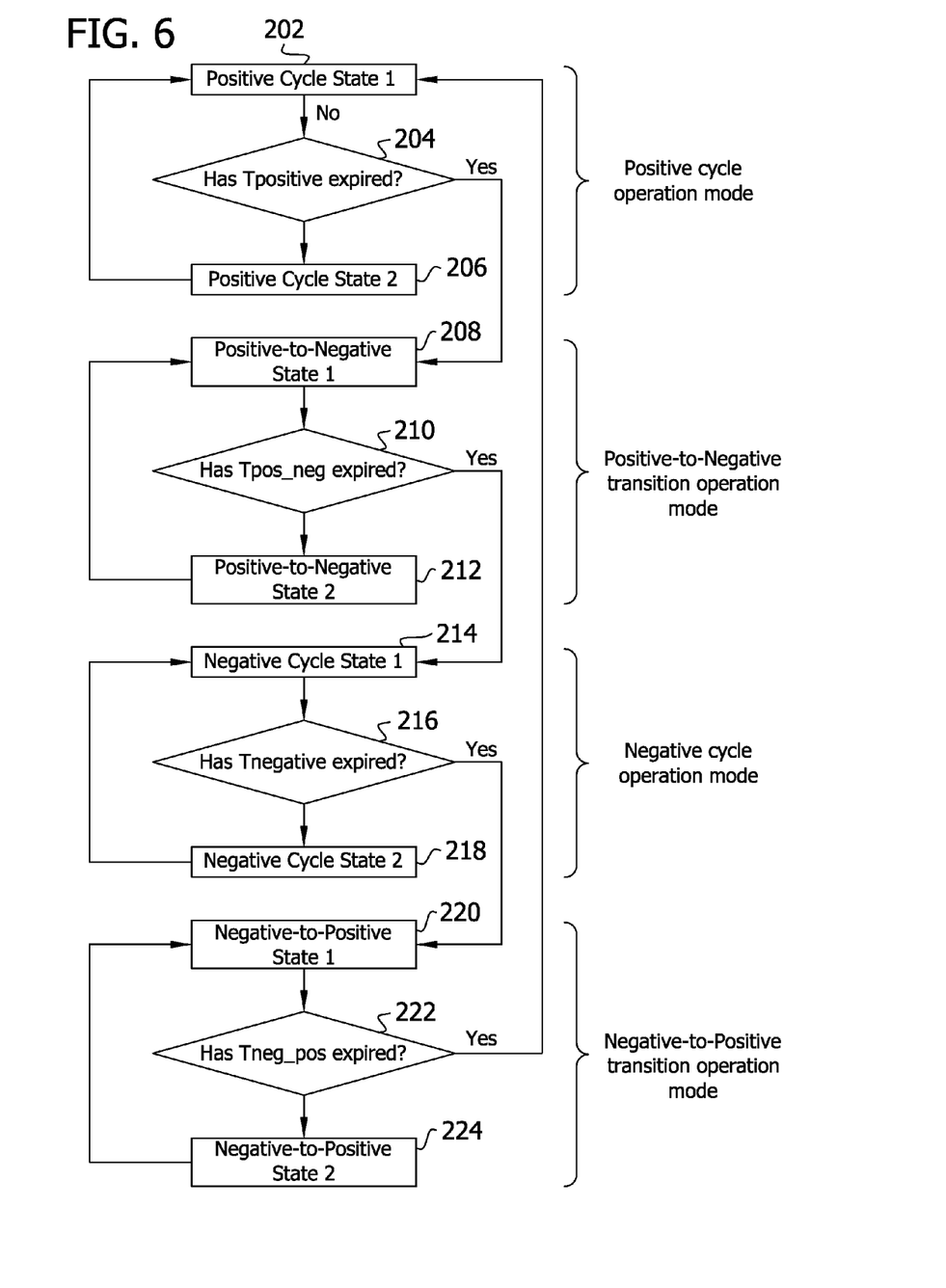
FIG. 6 is a flow chart illustrating an exemplary sequence of operating modes according to embodiments disclosed herein.

FIG. 6 is a flow chart illustrating exemplary operations modes implemented by the controller 120 for providing an AC voltage signal to the lamp 106 in accordance with an embodiment of the invention. At 202, the controller 120 initiates operation of the inverter in the positive cycle operation mode. The positive cycle operation mode has a predefined duration period, $T_{positive}$. In an exemplary embodiment, $T_{positive}$ has a predefined value of 3.2 milliseconds. When the positive cycle operation mode is initiated, the controller 120 operates the inverter, indicated at 202, in the positive cycle state 1 for a time period of $t_{pos\_cycle\_state1}$. In an exemplary embodiment, the time period $t_{pos\_cycle\_state1}$ has a pre-defined value of 5.0 μsec. As indicated at 204 if the time period $T_{positive}$ for the positive cycle operation mode has not expired, the controller 120 then, at 206, operates the inverter in the positive cycle state 2 for a time period of $t_{pos\_cycle\_state2}$. In an exemplary embodiment, the time period $t_{pos\_cycle\_state2}$ has a pre-defined value of 12.0 μsec which is based on the amount of time that it takes for the current through the first inductor $L_{buck}$ to reach zero. After operating the inverter in the positive cycle state 2 for the time period $t_{pos\_cycle\_state2}$, the controller 120 returns the inverter to the positive cycle state 1 at 202. The controller 120 continues to alternately operate the inverter between the positive cycle state 1 and the positive cycle state 2 for the duration of the positive cycle operation mode time period $T_{positive}$. As such, according to the exemplary embodiment, during the positive cycle operation mode, the first switching component Q1 is switched at a frequency of 58.8 kHz and the fourth switching component Q4 is switched at a frequency of 156.25 Hz.

When the positive cycle operation mode time period $T_{positive}$ expires, the controller 120 initiates a positive-to-negative transition operation mode. The positive-to-negative transition operation mode has a predefined duration period, $T_{pos-to-neg}$. In an exemplary embodiment, $T_{pos-to-neg}$ has a predefined value of around 46 microseconds. When the positive-to-negative transition operation mode is initiated, the controller 120 operates the inverter, indicated at 208, in the positive-to-negative state 1 for a time period of $t_{pos-neg\_state1}$. The time period $t_{pos-neg\_state1}$ is a function of the peak value $I_{MAX}$ for the current that is passed through the first inductor $L_{buck}$ causing the saturation of the first inductor $L_{buck}$. In particular the value of the time period $t_{pos-neg\_state1}$ is given as follows $$t_{pos-neg\_state1} = \frac{L_{BUCK} I_{MAX}}{DC\ Bus\ Voltage + Lamp\ Voltage}$$

The peak value $I_{MAX}$ for the current is based on the inductance value of the first inductor $L_{buck}$. In an exemplary embodiment, the inductance value of the first inductor $L_{buck}$ is 285 micro Henrys, and the peak value $I_{MAX}$ for the current is accordingly about 9 Amps. In the exemplary embodiment, the DC bus voltage is 460 Volts and the lamp voltage is 135 Volts. As such, in accordance with the exemplary embodiment, the duration for the positive-to negative state 1 $t_{pos-neg\_state1}$ is about 4.3 microseconds.

As indicated at 210 if the time period $T_{pos-to-neg}$ for the positive-to-negative transition operation mode has not expired, the controller 120 then, at 212, operates the inverter in the positive-to-negative state 2 for a time period of $t_{pos-neg\_state2}$. In an exemplary embodiment, the time period $t_{pos-neg\_state2}$ has a pre-defined value of 7.9 μsec, which is based on the amount of time that it takes for the current through the first inductor $L_{buck}$ to reach zero. After operating the inverter in the positive-to-negative state 2 for the time period $t_{pos-neg\_state2}$, the controller 120 returns the inverter to the positive-to-negative state 1 at 208. The controller 120 continues to alternately operate the inverter between the positive-to-negative state 1 and the positive-to-negative state 2 for the duration of the positive-to-negative transition operation mode time period $T_{pos-to-neg}$.

When the positive-to-negative transition operation mode time period $T_{pos-to-neg}$ expires, the controller 120 initiates the negative cycle operation mode. The negative cycle operation mode has a predefined duration period, $T_{negative}$. In an exemplary embodiment, $T_{negative}$ has a predefined value of 3.2 milliseconds. When the negative cycle operation mode is initiated, the controller 120 operates the inverter, indicated at 214, in the negative cycle state 1 for a time period of $t_{neg\_cycle\_state1}$. In an exemplary embodiment, the time period $t_{neg\_cycle\_state1}$ has a pre-defined value of 5.0 μsec. As indicated at 216 if the time period $T_{negative}$ for the negative cycle operation mode has not expired, the controller 120 then, at 218, operates the inverter in the negative cycle state 2 for a time period of $t_{neg\_cycle\_state2}$. In an exemplary embodiment, the time period $t_{neg\_cycle\_state2}$ has a pre-defined value of 12.0 μsec which is based on the amount of time that it takes for the current through the first inductor $L_{buck}$ to reach zero. After operating the inverter in the negative cycle state 2 for the time period $t_{neg\_cycle\_state2}$, the controller 120 returns the inverter to the negative cycle state 1 at 214. The controller 120 continues to alternately operate the inverter between the negative cycle state 1 and the negative cycle state 2 for the duration of the negative cycle operation mode time period $T_{negative}$. As such, according to the exemplary embodiment, during the negative cycle operation mode, the second switching component Q2 is switched at a frequency of 58.8 kHz and the third switching component Q3 is switched at a frequency of 156.25 Hz.

When the negative cycle operation mode time period $T_{negative}$ expires, the controller 120 initiates negative-to-positive transition operation mode. The negative-to-positive transition operation mode has a predefined duration period, $T_{neg-to-pos}$. In an exemplary embodiment, $T_{neg-to-pos}$ has a predefined value of around 46 microseconds. When the negative-to-positive transition operation mode is initiated, the controller 120 operates the inverter, indicated at 220, in the negative-to-positive state 1 for a time period of $t_{neg-pos\_state1}$. The time period $t_{neg-pos\_state1}$ is a function of the peak value $I_{MAX}$ for the current that is passed through the first inductor $L_{buck}$ causing the saturation of the first inductor $L_{buck}$. As similarly described above in connection with the positive-to-negative state 1, the value of the time period $t_{neg-pos\_state1}$ is given as follows $$t_{neg-pos\_state1} = \frac{L_{BUCK} I_{MAX}}{DC\ Bus\ Voltage + Lamp\ Voltage}$$

The peak value $I_{MAX}$ for the current is based on the inductance value of the first inductor $L_{buck}$. In an exemplary embodiment, the inductance value of the first inductor $L_{buck}$ is 285 micro Henrys, and the peak value $I_{MAX}$ for the current is accordingly about 9 Amps. In the exemplary embodiment, the DC bus voltage is 460 Volts and the lamp voltage is 135 Volts. As such, in accordance with the exemplary embodiment, the duration for the negative-to-positive state 1 $t_{neg\text{-}pos\_state1}$ is about 4.3 microseconds.

As indicated at 222 if the time period $T_{neg\text{-}to\text{-}pos}$ for the negative-to-positive transition operation mode has not expired, the controller 120 then, at 224, operates the inverter in the negative-to-positive state 2 for a time period of $t_{pos\text{-}neg\_state2}$. In an exemplary embodiment, the time period $t_{pos\text{-}neg\_state2}$ has a pre-defined value of 7.9 µsec, which is based on the amount of time that it takes for the current through the first inductor $L_{buck}$ to reach zero. After operating the inverter in the positive-to-negative state 2 for the time period $t_{pos\text{-}neg\_state2}$, the controller 120 returns the inverter to the positive-to-negative state 1 at 220. The controller 120 continues to alternately operate the inverter between the negative-to-positive state 1 and the negative-to-positive state 2 for the duration of the negative-to-positive transition operation mode time period $T_{neg\text{-}to\text{-}pos}$.

When the negative-to-positive transition operation mode time period $T_{neg\text{-}to\text{-}pos}$ expires, the controller 120 returns to the positive cycle operation mode. The controller 120 continues to cycle through the positive cycle operation mode, positive-to-negative transition mode, negative cycle operation mode, and negative-to-positive transition mode as described above in order to provide the AC voltage signal to the lamp 106.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A driver circuit comprising:
a plurality of switching components, wherein the plurality of switching components includes a first switching leg and a second switching leg, each connected between a first direct current voltage bus and a second direct current voltage bus, wherein the first switching leg and the second switching leg each include at least a first switching component and a second switching component, and wherein the first switching component of the first switching leg is connected to the second switching component of the second switching leg to form a first diagonal pair and the second switching component of the first switching leg is connected to the first switching component of the second switching leg to form a second diagonal pair;
a load circuit connecting the first switching leg and the second switching leg, wherein the load circuit comprises:
a first inductor connected to a terminal between the first switching component and the second switching component of the first switching leg;
a second inductor connected to a terminal between the first switching component and the second switching component of the second switching leg; and
lamp terminals connected between the first inductor and the second inductor and connected in series with the second inductor;
a capacitor connected in parallel with the series connected lamp terminals and the second inductor; and
a control circuit connected to the plurality of switching components, wherein during a commutation period the control circuit is configured to operate the first diagonal pair in a non-conductive state and to operate the second diagonal pair in a conductive state, until a current through the first inductor reaches a predefined value, and then to operate the second diagonal pair in a non-conductive state until the current through the first inductor reaches zero.

2. The driver circuit of claim 1 wherein the first switching leg comprises:
a first switching component connected to the first direct current voltage bus;
a first diode connected across the first switching component;
a second switching component connected between the first switching component and the second direct current voltage bus; and
a second diode connected across the second switching component;
and wherein the second switching leg comprises:
a third switching component connected to the first direct current voltage bus;
a third diode connected across the third switching component;
a fourth switching component connected between the third switching component and the second direct current voltage bus; and
a fourth diode connected across the fourth switching component; such that the first switching component and the fourth switching component form the first diagonal pair and the second switching component and the third switching component form the second diagonal pair.

3. The driver circuit of claim 1 wherein the control circuit is further configured to operate the plurality of switching components in a first operation mode for a first time period during which the current through the first inductor has a first polarity, and wherein the control circuit is configured to operate the switching components in a second operation mode for a second time period during which a current through the second inductor has a second polarity, and wherein the commutation period occurs between the first and second time periods.

4. The driver circuit of claim 1 wherein the control circuit is configured to operate the plurality of switching components so that the commutation period has a duration of less than 50 microseconds.

5. The driver circuit of claim 1, further comprising a ballast and a high intensity discharge lamp connected across the lamp terminals, wherein the ballast comprises:

an electromagnetic interference filter configured to receive alternating current voltage from a power source;
a rectifier connected to the electromagnetic interference filter to convert the alternating current voltage to direct current voltage; and
a power factor control circuit connected to the rectifier, the power factor control circuit having a first output connected to the first direct current voltage bus and a second output connected to the second direct current voltage bus, wherein the power factor control circuit is configured to produce a high direct current voltage output across the first and second outputs.

6. A driver circuit comprising:
a plurality of switching components, wherein the plurality of switching components includes a first switching leg and a second switching leg, each connected between a first direct current voltage bus and a second direct current voltage bus, wherein the first switching leg and the second switching leg each include at least a first switching component and a second switching component, and wherein the first switching component of the first switching leg is connected to the second switching component of the second switching leg to form a diagonal pair and the second switching component of the first switching leg is connected to the first switching component of the second switching leg to form a diagonal pair;
a load circuit connecting the first switching leg and the second switching leg, wherein the load circuit comprises:
  a first inductor connected to a terminal between the first switching component and the second switching component of the first switching leg;
  a second inductor connected to a terminal between the first switching component and the second switching component of the second switching leg; and
  lamp terminals connected between the first inductor and the second inductor and connected in series with the second inductor;
a capacitor connected in parallel with the series connected lamp terminals and the second inductor; and
a control circuit having a plurality of control outputs, wherein each control output in the plurality of control outputs is connected to a corresponding switching component in the plurality of switching components, wherein the control circuit is configured to operate the plurality of switching components:
  (i) in a first operation mode for a first time period, during which a current through the first inductor has a first polarity;
  (ii) in a second operation mode for a second time period, during which the current through the first inductor has a second polarity that is opposite of the first polarity; and
  (iii) in a third operating mode during a commutation period, during which a polarity of a current through the capacitor is being reversed;
wherein during the commutation period, the control circuit is configured to operate a first diagonal pair in a non-conductive state and to operate a second diagonal pair in a conductive state, until the current through the first inductor reaches a predefined value, and then to operate the second diagonal pair in a non-conductive state until the current through the first inductor reaches zero.

7. The driver circuit of claim 6 wherein the first switching leg comprises:
a first switching component connected to the first direct current voltage bus;
a first diode connected across the first switching component;
a second switching component connected between the first switching component and the second direct current voltage bus; and
a second diode connected across the second switching component;
and wherein the second switching leg comprises:
a third switching component connected to the first direct current voltage bus;
a third diode connected across the third switching component;
a fourth switching component connected between the third switching component and the second direct current voltage bus; and
a fourth diode connected across the fourth switching component;
such that the first switching component and the fourth switching component form a diagonal pair and the second switching component and the third switching component form a diagonal pair.

8. The driver circuit of claim 6 wherein the first operation mode is a positive cycle operation mode during which the current through the first inductor has a positive polarity, and the second operation mode is a negative cycle operation mode during which the current through the first inductor has a negative polarity, and wherein the control circuit is configured to operate in the third operating mode during transitions from the positive cycle operation mode to the negative cycle operation mode and from the negative cycle operation mode to the positive cycle operation mode.

9. The driver circuit of claim 6 wherein the third operation mode is a positive-to-negative transition mode during a commutation period in which the polarity of the current through the capacitor is being changed from positive to negative, and during the positive-to-negative transition mode the first diagonal pair is the diagonal pair of switching components comprising the first switching component of the first switching leg and the second switching component of the second switching leg, and the second diagonal pair of switching components is the diagonal pair of switching components comprising the second switching component of the first switching leg and the first switching component of the second switching leg.

10. The driver circuit of claim 6 wherein the third operation mode is a negative-to-positive transition mode during a commutation period in which the polarity of the current through the capacitor is being changed from negative to positive, and during the negative-to-positive transition mode the first diagonal pair of switching components is the diagonal pair of switching components comprising the second switching component of the first switching leg and the first switching component of the second switching leg, and the second diagonal pair of switching components is the diagonal pair of switching components comprising the first switching component of the first switching leg and the second switching component of the second switching leg.

11. The driver circuit of claim 6 wherein the control circuit is configured to operate the plurality of switching components so that the commutation period has a duration of less than 50 microseconds.

12. The driver circuit of claim 5, further comprising a ballast and a high intensity discharge lamp connected across the lamp terminals, wherein the ballast comprises:
an electromagnetic interference filter configured to receive alternating current voltage from a power source;

a rectifier connected to the electromagnetic interference filter to convert the alternating current voltage to direct current voltage; and a power factor control circuit connected to the rectifier, the power factor control circuit having a first output connected to the first direct current voltage bus and a second output connected to the second direct current voltage bus, wherein the power factor control circuit is configured to produce a high direct current voltage output across the first and second outputs.

13. A ballast comprising:

an electromagnetic interference filter configured to receive alternating current voltage from a power source;

a rectifier connected to the electromagnetic interference filter to convert the alternating current voltage to direct current voltage;

a power factor control circuit connected to the rectifier, the power factor control circuit having a first output and a second output, wherein the power factor control circuit is configured to produce a high direct current voltage output across the first and second outputs;

a first direct current voltage bus connected to the first output of the power factor control circuit;

a second direct current voltage bus connected to the second output of the power factor control circuit;

a plurality of switching components, wherein the plurality of switching components includes a first switching leg and a second switching leg, each connected between a first direct current voltage bus and a second direct current voltage bus, wherein the first switching leg and the second switching leg each include at least a first switching component and a second switching component, and wherein the first switching component of the first switching leg is connected to the second switching component of the second switching leg to form a diagonal pair and the second switching component of the first switching leg is connected to the first switching component of the second switching leg to form a diagonal pair;

a load circuit connecting the first switching leg and the second switching leg, wherein the load circuit comprises:
  a first inductor connected to a terminal between the first switching component and the second switching component of the first switching leg;
  a second inductor connected to a terminal between the first switching component and the second switching component of the second switching leg; and
  lamp terminals connected between the first inductor and the second inductor and connected in series with the second inductor;

a capacitor connected in parallel with the series connected lamp terminals and the second inductor; and a control circuit connected to the plurality of switching components, wherein during a commutation period the control circuit is configured to operate a first diagonal pair in a non-conductive state and to operate a second diagonal pair in a conductive state, until a current through the first inductor reaches a predefined value, and then to operate the second diagonal pair in a non-conductive state until the current through the first inductor reaches zero.

14. The ballast of claim 13 wherein the first switching leg comprises:

a first switching component connected to the first direct current voltage bus;

a first diode connected across the first switching component;

a second switching component connected between the first switching component and the second direct current voltage bus; and a second diode connected across the second switching component;

and wherein the second switching leg comprises:

a third switching component connected to the first direct current voltage bus;

a third diode connected across the third switching component;

a fourth switching component connected between the third switching component and the second direct current voltage bus; and a fourth diode connected across the fourth switching component;

such that the first switching component and the fourth switching component form a diagonal pair and the second switching component and the third switching component form a diagonal pair.

15. The ballast of claim 13 further comprising an electrolytic capacitor connected in a shunt configuration across the first and second outputs of the power factor control circuit.

16. The ballast of claim 13 further comprising a high intensity discharge (HID) lamp connected across the lamp terminals.

17. The ballast of claim 13 wherein the control circuit is further configured to operate the plurality of switching components in a positive operation mode for a first time period during which the current through the first inductor has a positive polarity, and wherein the control circuit is configured to operate the plurality of switching components in a negative operation mode for a second time period during which a current through the second inductor has a negative polarity, and wherein the commutation period occurs between the first and second time periods.

18. The ballast of claim 13 wherein during a commutation period in which the polarity of a current through the capacitor is being changed from positive to negative, the first diagonal pair is the diagonal pair of switching components comprising the first switching component of the first switching leg and the second switching component of the second switching leg, and the second diagonal pair of switching components is the diagonal pair of switching components comprising the second switching component of the first switching leg and the first switching component of the second switching leg.

19. The ballast of claim 13 wherein during a commutation period in which a polarity of a current through the capacitor is being changed from negative to positive, the first diagonal pair of switching components is the diagonal pair of switching components comprising the second switching component of the first switching leg and the first switching component of the second switching leg, and the second diagonal pair of switching components is the diagonal pair of switching components comprising the first switching component of the first switching leg and the second switching component of the second switching leg.

20. The ballast of claim 13 wherein the control circuit is configured to operate the plurality of switching components so that the commutation period has a duration of less than 50 microseconds.

* * * * *